(12) United States Patent
Freitas et al.

(10) Patent No.: US 7,379,852 B2
(45) Date of Patent: May 27, 2008

(54) N-PHASE INTERFACE TRACKING METHOD UTILIZING UNIQUE ENUMERATION OF MICROGRID CELLS

(75) Inventors: Christopher J. Freitas, San Antonio, TX (US); Mary Ann Clarke, San Antonio, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 454 days.

(21) Appl. No.: 10/782,634

(22) Filed: Feb. 18, 2004

(65) Prior Publication Data

US 2005/0182603 A1   Aug. 18, 2005

(51) Int. Cl.
G06G 7/48 (2006.01)
G06G 7/50 (2006.01)
G06G 7/60 (2006.01)

(52) U.S. Cl. ............................................. 703/9; 703/2

(58) Field of Classification Search .................... 703/9, 703/10, 2
See application file for complete search history.

(56) References Cited

U.S. PATENT DOCUMENTS

| | | | | |
|---|---|---|---|---|
| 4,821,164 | A * | 4/1989 | Swanson | 702/5 |
| 6,611,736 | B1 * | 8/2003 | Waite et al. | 700/281 |
| 6,826,520 | B1 * | 11/2004 | Khan et al. | 703/10 |
| 6,922,662 | B2 * | 7/2005 | Manceau et al. | 703/10 |
| 7,050,058 | B2 * | 5/2006 | Liang et al. | 345/473 |

OTHER PUBLICATIONS

Murray Rudman, A volume-tracking method for incompressible multifluid flows with large density variations, International Journal for Numerical Methods in Fluids, vol. 28, Issue 2, pp. 357-378, Dec. 1998.*

William J. Rider, "Reconstructing Volume Tracking", Journal of Computational Physics vol. 141, Issue 2 , Apr. 10, 1998, pp. 112-152.*

Shea Chen, "The surface marker and mirco cell method" International Journal for Numerical Methods in Fluids, VL:25 No. 7 YR: 1997 John Wiley & Sons, Ltd. Mechanical Engineering Department, Southern Methodist University, US: p. 749-778 http://dx.doi.org/10.1002/(SICI)1097-0363(19971015)25:7<749::AID-FLD584>3.0.CO;2-O.*

John Strain, "A Fast Modular Semi-Lagrangian Method for Moving Interfaces", Journal of Computational Physics vol. 161, Issue 2, Jul. 1, 2000, pp. 512-536.*

Hirt, C.W., and Nichols, B.D., Volume of Fluid (VOF) Method for the Dynamics of Free Boundaries, *Journal of Computational Physics*, vol. 39, 201-225, 1981.

(Continued)

*Primary Examiner*—Kamini Shah
*Assistant Examiner*—David Silver
(74) *Attorney, Agent, or Firm*—Stevem L. Christian; Richard J. Schulte

(57) ABSTRACT

A method for tracking N fluid materials and their associated interfaces during simulated fluid flow is disclosed. A microgrid cell methodology is embedded on a regular macrogrid to subdivide and then tag fluid materials in a computational system preferably using a prime numbering algorithm. The motion of microgrid cells is tracked based on local velocity conditions, rectifying small anomalies by a coupled evaluation of local volume fraction fields and global mass conservation. Volume fractions can be calculated at any time step via an evaluation of the prime locations so that average cellular density and viscosity values can be regularly updated.

11 Claims, 11 Drawing Sheets

OTHER PUBLICATIONS

Rider, W.J., and Kothe, D.B., Reconstructing Volume Tracking, *Journal of Computational Physics*, vol. 141, 112-152, 1998.

Gueyffier, D., Li, J., Nadim, A., Scardovelli, R., and Zaleski, S., Volume-of-Fluid Interface Tracking With Smotthed Surface Stress Methods for Three Dimensional Flows, *Journal of Computational Physics*, vol. 152, 423-456, 1999.

Scardovelli, R., and Zaleski, S., Analytical Relations Connecting Linear Interfaces and Volume Fractions in Rectangular Grids, *Journal of Computational Physics*, vol. 164, 228-237, 2000.

Udaykumar, H.S., Mittal, R., and Rampunggoon, P., Interface Tracking Finite Volume Method for Complex Solid-Fluid Interactions on Fixed Meshes, *Communications in Numerical Methods in Engineering*, vol. 18, 89-97, 2002.

Dai, M., Wang, H., Perot, J.B., and Schmidt, D.P., A Numerical Method for Interface Tracking, *ILASS Americas, 15th Annual Conference on Liquid Atomization and Spray Systems*, Madison, WI, May 2002.

Scardovelli, R., Aulisa, E., Manservisi, S., and Marra, V., A Marker-VOF Algorithm for Incompressible Flows With Interfaces, *Proceedings of ASME FEDSM'02, ASME 2002 Fluids Engineering Division Summer Meeting*, Montreal, Quebec, Canada FEDSM2002-31241, 1-6, Jul. 14-18, 2002.

Gao, D., Morley, N.B., and DHIR, V., Numerical Simulation of Wavy Falling Film Flow Using VOF Method, *Journal of Computational Physics*, vol. 192, 624-642, 2003.

Ashgriz, N. and Poo, J. Y., 1991, FLAIR: Flux line-segment model for advection and interface reconstruction. Journal of Computational Physics, vol. 93, p. 449-468.

Daly, B. J., 1969, A technique for including surface tension effects in hydrodynamic calculations. Journal of Computational Physics, vol. 4, p. 97-117.

Freitas, C. J., 1986, Nonlinear transient phenomena in a three-dimensional cavity flow: A numerical investigation. PhD dissertation, Stanford University. With Abstract.

Freitas, C.J., 1988, Non-linear transient phenomena in a complex recirculating flow: a numerical investigation. International Journal for Numerical Methods in Fluids, vol. 8, p. 769-802.

Harlow, F. H. and Welch, J. E., 1965, Numerical calculation of time-dependent viscous incompressible flow of fluid with free surface. Physics of Fluids, vol. 8(12), p. 2182-2189.

LaFaurie, B., Nardone, C.; Scardovelli, R., Zaleski, S., and Zanetti, G., 1994, Modeling merging and fragmentation in multiphase flows with Surfer, Journal of Computational Physics, vol. 113, p. 134-147.

Nichols, B. D. and Hirt, C. W., 1973, Calculating three-dimensional free surface flows in the vicinity of submerged and exposed structures. Journal of Computational Physics, vol. 12, p. 234-246.

Noh, W. F. and Woodward, P., 1976, SLIC (Simple Line Interface Calculations). Lecture Notes in Physics, vol. 59, p. 330-340.

Osher, S. and Sethian, J. A., 1988, Fronts propagating with curvature-dependent speed: algorithms based on Hamilton-Jacobi formulations. Journal of Computational Physics, vol. 79, p. 12-49.

Rhee, H. S., Koseff, J. R., and Street, R. L., 1984, Flow visualization of a recirculating flow by rheoscopic liquid and liquid crystal technique. Experiments in Fluids, p. 57-64.

Sussman, M., Smereka, P. and Osher, S., 1994, A level set approach for computing solutions to incompressible two-phase flow. Journal of Computational Physics, vol. 114, p. 146-159.

Takizawa, A., Koshizuka, S., and Kondo, S., 1992, Generalization of physical component boundary fitted co-ordinate (PCBFC) method for the analysis of free-surface flow. International Journal of Numerical Methods in Fluids, vol. 15, p. 1213-1237.

Tomiyama, A., Nakahara, Y., and Abe, S., 2002, An interface tracking method based on volume tracking in embedded micro cells. Proceedings of ASME FEDSM'02, AMSE 2002 Fluids Engineering Division Summer Meeting, Montreal, Quebec, Canada, FEDSM2002-31147, p. 1-6.

Youngs, D. L., 1982, Time-dependent multi-material flow with large fluid distortion. (in) Morton, K. W. and Baines, M. J. (eds) Numerical Methods for fluid dynamics. London: Academic Press. p. 273-285.

\* cited by examiner

| (4A) | | | | | | | (4B) | Numerical representation | | | | | |
|---|---|---|---|---|---|---|---|---|---|---|---|---|---|
| | | | | | | | | 43 | 43 | 43 | 43 | 43 | 53 |
| | | | | | | | | 1 | 43 | 43 | 2279 | 53 | 53 |
| | | | | | | | | 43 | 43 | 43 | 53 | 53 | 53 |
| | | | | | | | | 43 | 43 | 2021 | 107113 | 53 | 53 |
| | | | | | | | | 47 | 47 | 47 | 47 | 47 | 53 |
| | | | | | | | | 47 | 47 | 47 | 1 | 47 | 53 |

FIG. 4

|  | (5A) | | | | | | | (5B) | | | | | |
|---|---|---|---|---|---|---|---|---|---|---|---|---|---|
| | | | X | | | X | | O | | X | O | | X |
| | X | | X | | X | | | X | O | X | O | X | O |
| | | X | X | X | | | | | X | ⊠ | ⊠ | O | |
| | X | X | S | X | X | X | | ⊠ | ⊠ | ⊠ | S | ⊠ | ⊠ |
| | | X | X | X | | | | | X | ⊠ | ⊠ | O | |
| | X | | X | | X | | | X | O | X | O | X | O |

FIG. 5

N-PHASE INTERFACE TRACKING METHOD UTILIZING UNIQUE ENUMERATION OF MICROGRID CELLS

TECHNICAL FIELD

This invention relates generally to methods for the simulation of multiphase fluid flows, and more particularly, to those methods which track interfaces between immiscible fluids.

BACKGROUND OF THE INVENTION

The study of interfacial flow is a broad topic of interest in many different research disciplines. Physicists, biologists, engineers and other scientists all share a stake in accurate representation of interfacial position. Whether pipeline flow of crude oil mixtures, cellular disruption or the development of galaxies is to be modeled, interfacial movement intimately influences calculations by accounting for a redistribution of local density functions. In general, the problems of interest have as a common element the requirement to resolve through numerical simulation the complex flow patterns that result from the flow of immiscible (or semi-immiscible) fluids.

Published works dating from the 1960's until now relate an ever-improving understanding of numerical algorithms that allow for an accurate description of interface position. These algorithms are generally categorized as either surface methods or volume methods. However, there is still no generalized method presently developed that allows for the numerical simulation of the dynamic movement of three or more fluid materials and their interfaces.

A reference field or function that moves with an interface typically characterizes surface methods. Sometimes the reference is a mass-less fixed particle along the interface (Daly, 1969; Takizawa et. al, 1992). Other times a level set function which tracks the shortest distance to an interface from a fixed point is offered (Sussman et. al, 1994; Osher and Sethian, 1988; Sethian, 1996). Further references indicate height functions are implemented where a reference line or plane is chosen in the computational domain (Nichols and Hirt, 1973). All of these methods give accurate descriptions of two fluid, single interface problems that do not involve folding, breaking or merging interfaces. The biggest advantage of surface methods is that an interface position is explicitly known for all time.

Volume methods, however, build a reference within the fluids under evaluation. Typically a method will discretely identify different materials on either side of an interface. Mixed cells then indicate the general location of an interface. An exact location is never discretely known, and volume methods are characterized by a reconstruction step whereby an approximate interface is built from local data consisting of volume and area fractions.

The volume methods may be further divided into 2 sub-cases to include particle methods and scalar advection methods. Particle methods include the marker and cell (MAC) method (Harlow and Welch, 1965; Daly, 1967) and the particle in cell (PIC) method (Harlow et.al, 1976). These algorithms employ the idea of mass-less particles to identify a particular material and then track their movements through a static grid based on local velocity conditions. The volume of fluid (VOF) method (Hirt and Nichols, 1981; Ashgriz and Poo, 1991; Lafaurie et.al, 1994) and various line techniques including SLIC (Noh and Woodward, 1976), PLIC (Youngs, 1982) and FLAIR (Ashgriz and Poo, 1991) implement several unidirectional sweeps to predict the change in volume fractions of cells at each time step based on a local resolution of the scalar transport equation. There are many combination algorithms presently used which implement both VOF and line techniques to capture even greater interface detail (Rider and Kothe, 1998; Gueyffier et al., 1999; Scardovelli et al., 2000, 2002). Volume methods offer good interfacial descriptions of complicated fluid geometries in both two and three dimensions and allow for interface folding, breaking, and merging. However these methods are restricted to cases involving only two materials.

Traditional VOF methods define a concentration function, C, to denote materials. Typically, $$C = \begin{cases} 1, & \text{fluid 1} \\ 0, & \text{fluid 2} \end{cases}$$

where values between 0 and 1 represent mixed cells.

C is then transported by the velocity field u via the scalar transport equation, $$\frac{\partial C}{\partial t} + u \cdot \nabla C = 0.$$

And finally, the average (or cell centered) values of density, $\rho$, and viscosity, $\mu$, are interpolated as: $\rho = C\rho_1 + (1-C)\rho_2$ and $\mu = C\mu_1 + (1-C)\mu_2$ where the subscripts 1 and 2 refer to materials 1 and 2. In this interpretation, C, although called a concentration function, acts as the fluid fraction of material 1 or 2 in any given cell.

Methods have been employed previously which have attempted to track two interfaces or three materials in a computational fluid simulation. These methods (Eulerian-Eulerian) operate by using control volumes which may contain at most three materials and two unique interfaces. As discussed above, at least a single set of conservation equations is still required to resolve the flow field dynamics, i.e., mass conservation equation and two or three momentum conservation equations dependent on the dimensionality of the problem (2D or 3D), or a complete set of conservation equations is solved for each material. However, no one to date has addressed the issue of uniquely identifying and tracking, with a single or multiple concentration function(s) $C_i$, three or more materials. The issue always distills down to the unique tracking and resolving of multiple interfaces in a computational cell. In addition, when multiple equation sets are used as possibly in Eulerian-Eulerian methods, the numerical problem becomes intractable when folding, breaking, and reforming interfaces exist due to the need to precisely define the interface shape inorder to apply the constitutive relationships between materials in this formulation. The above described computational fluid dynamic methods fail to provide a method which can readily handle explicit or implicit tracking of the interface between three or more generally immiscible fluid materials. The present invention provides an efficient and tractable method which overcomes the deficiency of current methods in tracking multiple fluid materials and their interfaces.

SUMMARY OF THE INVENTION

A method for tracking N materials and their interfaces in a computational domain is disclosed. A macrogrid including control volumes is created on a computational domain in which N materials and their interfaces are to be tracked. A microgrid including microgrid cells is overlaid upon the macrogrid with each of the microgrid cells being coupled to a control volume. The macrogrid and control volumes are initialized with initial and boundary conditions representative of the problem to be solved. A unique identifier number is assigned to each of the N materials and to the microgrid cells containing those N materials. Volume fractions for the N-materials in the control volumes can then be calculated. Similarly, average density and average viscosity for each of the control volumes may be discretely determined.

Equations of fluid motion (the Navier Stokes equations) may then be solved upon the macrogrid and control volumes using the initial and boundary conditions and properties dependent upon the volume fractions, i.e., average density and average viscosity, to arrive at local velocity conditions for the control volumes. The microgrid cells within the microgrid are then advected in response to the calculated local velocity conditions in the control volumes with voids and overlaps of the microcells occurring in the microgrid. The location of each of the advected microcells is tracked using the unique enumeration previously assigned to each of the microgrid cells. Preferably, this unique enumeration includes the use of prime numbers, such as those generated by an Eulerian quadratic number generator.

Overlapped microgrid cells are then reallocated within the microgrid so that only one microgrid cell is located in each space of the microgrid to effectively conserve mass and satisfy local fluid fraction gradient values. The contents of the microgrid cells can then be used in additional time steps or iterations to determine new values for volume fractions of the fluid materials in the microgrid cells. The equations of fluid motion can then be iteratively solved again using updated properties dependent upon the volume fractions. This process of iteratively determining new fluid fractions in the control volumes, solving equations of fluid motion to arrive at new velocity fields, advecting microcells in accordance with the newly derived velocity fields, and then reallocating the microcells to comport with constraints such as conservation of momentum and conservation of mass is repeated over many time steps to simulate the fluid flow.

A method for tracking cells in a fluid dynamics computation is now described. Unique identifier numbers are assigned to microgrid cells located in a grid. The unique identifiers are associated with respective N fluid materials. N may be 2 or more materials. Preferably, the unique identifiers are prime numbers, such as those generated by an Eulerian quadratic number generator.

The cells are advected within a grid in response to local velocity conditions such that some of the cells overlap one another while voids are also created in the grid. Grid locations with overlapped cells are identified by determining that a combination of the unique identifiers coexist in that grid location. The fluid materials of the microgrid cells disposed in a grid location can be determined using modular arithmetic when using unique identifiers which are prime numbers. The cells can then be reallocated to comport with specified conservation of mass and momentum restrictions with one unique identifier again occupying each space in the microgrid. Volume fractions of fluid materials in specific areas of a computational space can then be computed to determine properties, such as average density and average viscosity, which are to be used in a next time step to again solve the time-dependent fluid equations of motion.

It is an object of the present invention to provide a method for simulating fluid flow that can easily handle two or more generally immiscible fluid materials and track the interfaces between the different materials.

It is yet another object to provide a method for tracking two or more materials and their associated interfaces based on the creation of elemental pieces or microgrid cells of fluid material and the use of a unique tagging system based on prime numbers.

It is still yet another object to provide a method for tracking N materials and their associated interfaces by uniquely identifying and tracking, with a single concentration function C, N fluid materials wherein N may be 2 or greater.

BRIEF DESCRIPTION OF THE DRAWINGS

These and other objects, features and advantages of the present invention will become better understood with regard to the following description, pending claims and accompanying drawings where:

FIG. 4A shows an example of flux handling with prime enumerated microgrid cells showing a microgrid having overlapping cells and voids and FIG. 4B is a corresponding chart including a matrix of prime numbers and products of prime numbers corresponding to the materials in the microgrid cells;

FIGS. 5A and 5B illustrate a visualization of a 2D scanning technique wherein FIG. 5A shows a first scan and FIG. 5B shows a second scan which begins at a different starting point than the scan of FIG. 5A;

BEST MODE FOR CARRYING OUT THE INVENTION

The present invention provides a method for simulating the flow of N-immiscible fluid materials and tracking the position of the interfaces between the fluid materials. For the purpose of simplicity, an example utilizing three separate materials will be described. The method may easily be extended to model with a much larger number of fluid materials and interfaces. For example, using a particular number generator (Eulerian quadratic generator) and identification system for fluid materials, 39 materials may be used based on this prime number generator. Through use of other generators of unique identifiers, an even a higher number of materials and interfaces may be tracked.

Figure 1:
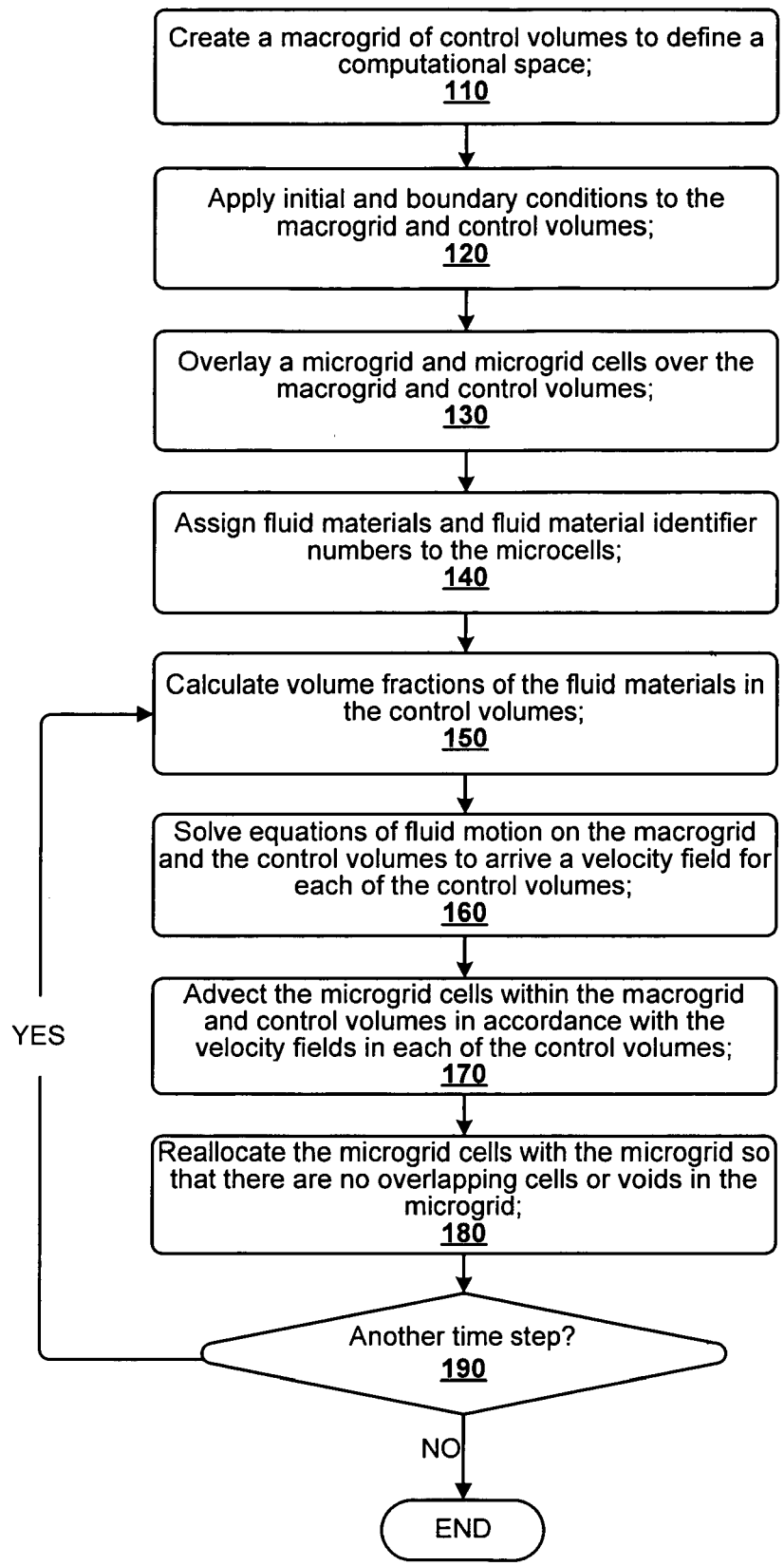
FIG. 1 is a flowchart of the overall steps taken in modeling the flow of N fluid materials and tracking the interfaces between the fluid materials.

An exemplary embodiment of a method for tracking N fluid materials and their interfaces, made in accordance with the present invention, is shown in a flowchart in FIG. 1.

A first step 110 is to create a macrogrid filled with macrocells or control volumes to define an overall computational space in which the flow of N fluid materials is to be simulated. For example, fluid flow circulating in a rectangular cavity will be described in greater detail below.

Step 120 includes applying initial and boundary conditions to the macrogrid and control volumes. In this exemplary embodiment, the boundary conditions include no-slip walls and a fixed tangential (or shear) velocity condition on the top surface of the cavity. Initial conditions are quiescent or zero velocity for the fluids with a hydrostatic pressure distribution imposed in the vertical direction due to gravity forcing. Those skilled in the art of computational fluid dynamics modeling and simulation will appreciate that models can be made employing, by way of example and not limitation, other boundary and initial conditions such as symmetry planes, inflow and outflow boundaries, constant pressure surfaces, and an initial mean velocity and density distribution applied to the fluid materials.

Figure 2:
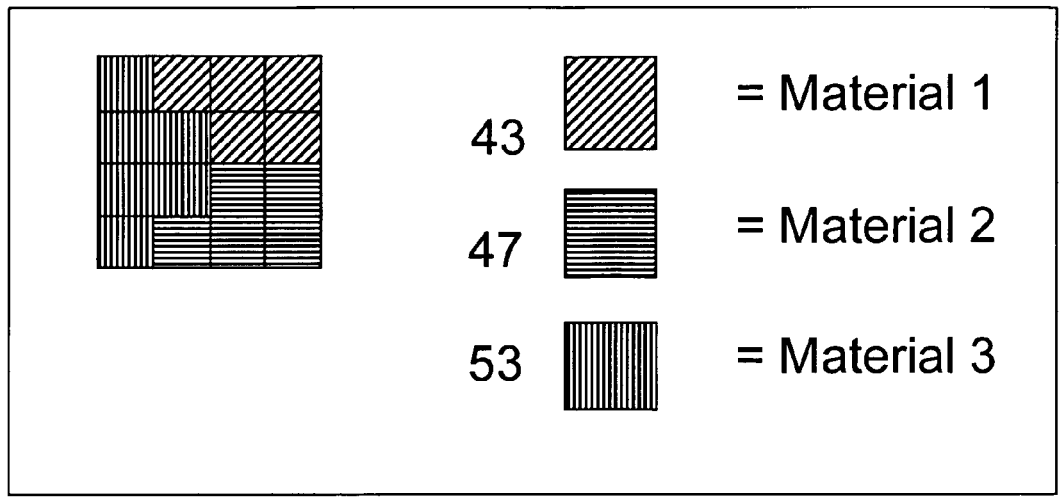
FIG. 2 illustrates a macrogrid including a macrocell or control volume which is overlayed with a 4×4 array of microgrid cells containing one of three distinct fluid materials which are identified by three corresponding prime numbers.

A microgrid filled with microgrid cells is then overlaid upon the macrogrid and control volumes in step 130. FIG. 2 illustrates a single macrocell or control volume which is overlaid with a microgrid including a 4×4 array of microcells. In this particular preferred embodiment, all of the microgrid cells are of the same size and shape. The present invention could also be extended to use microgrid cells having different sizes and shapes. Microgrid cells offer a discrete and simple way to delineate materials in a computational space without the complexity of formal interface reconstruction at every time step. In the microcell technique of the present exemplary embodiment of this invention, the resolution of an interface is predetermined by the size of the microgrid cells themselves and no cell by cell reconstruction is necessary.

N fluid materials are then assigned in step 140 to each of the microgrid cells. In this example, N=3 as the flow of three fluid materials will be simulated. In FIG. 2, note that the microgrid cells are shaded to depict each of three different fluid materials 1, 2 and 3. As a numerical representation of the physical system is created, a single prime number or identifier associated with a particular fluid material is assigned to each microgrid cell. For example, all microgrid cells that contain material N=1 are given the identifier 43. All microgrid cells that contain material N=2 are assigned the identifier 47 and cells containing material N=3 are labeled with the identifier 53. In this way, a prime representation of the system is built. Prime numbers less than 43 are not used in this exemplary embodiment because of a requirement that the square of any prime number be greater than the largest prime number assigned to a material. This assignment renders the evaluated primes into a mathematically unique set which enhances the tracking of microcells.

Figure 3:
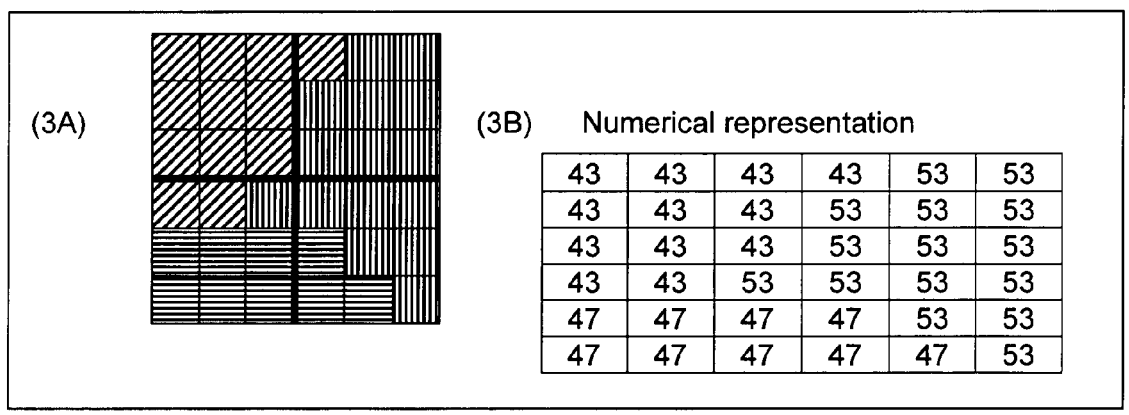
FIG. 3A shows a macrogrid including an array of 2×2 control volumes with an array of 3×3 microgrid cells overlaying each of the control volumes and FIG. 3B is a corresponding chart including a matrix of prime numerals corresponding to the materials in the microgrid cells.

Utilizing the same shading scheme as depicted in FIG. 2, FIG. 3 shows a macrogrid including a 2×2 array of control volumes each with a 3×3 array of microcells. Assume this is at an initial or first time step or t=0 seconds. The location of each material is accounted for in a microcellular fashion as shown in FIG. 3B utilizing a chart with a corresponding numerical representation of the microgrid cells and their assigned fluid materials.

A prime number generator is utilized in this preferred embodiment that will create enough unique primes to delineate every material in the simulation. This particular prime number generator has the following characteristics:

1. the smallest prime number generated squared is greater than the largest prime number generated; and
2. the generator creates a monotonically increasing set of primes.

By way of example and not limitation, a good 'all-purpose' generator that has these characteristics, and allows up to N=39 (where N is a positive integer), is the Eulerian quadratic generator, $p(N)=N^2+N+41$. By the nature of how an algebraic generator works, some primes may be skipped. This particular generator creates a set of non-inclusive primes from 43 to 1601 as is demonstrated in Table 1. Note that the largest prime generated, 1601, is smaller than the smallest prime generated squared, $43^2=1849$.

TABLE 1

| Prime generator example. | | |
|---|---|---|
| N | $p(N) = N^2 + N + 41$ | $p^2 (N)$ |
| 1 | 43 | 1849 |
| 2 | 47 | |
| 3 | 53 | |
| 37 | 1447 | |
| 38 | 1522 | |
| 39 | 1601 | |
| 40 | 1681 | |
| | (not prime) = $41^2$ | |

In step 150, the volume fractions of the fluid materials in each of the control volumes are calculated. The prime marking technique is employed to resolve the fluid fraction of each material in each control volume. Fluid fraction, $f_N$, may be recovered as a volume centered value at any time by using the formula:

$$f_N = Q_N \left( \frac{V_{MICRO}}{V_{MACRO}} \right),$$

wherein $Q_N$ is the number of microgrid cells occupied by material N, $V_{MICRO}$ is the volume of a single microcell and $V_{MACRO}$ is the volume of a single control volume.

Given the example of FIG. 2, and assuming evenly distributed microgrid cells in the 1×1 control volume, $f_1=5/16=0.3125$; $f_2=5/16=0.3125$ and $f_3=6/16=0.3750$.

Average volume centered values of density ρ and viscosity μ, for example, in each control volume can then be recovered through:

$$\rho = \sum_N f_N \rho_N \text{ and } \mu = \sum_N f_N \mu_N \text{ respectively.}$$

In step 160, equations of fluid motion are solved for each of the macrogrid control volumes to arrive at a velocity field for each of the control volumes (as well as other conserved variables such as pressure, turbulent kinetic energy, and temperature). The solution of these equations depends upon the volume centered values of density ρ and viscosity μ for each of the control volumes (or, in general, all fluid property variables). These equations rely upon principles of conservation of mass, conservation of momentum, and conservation of energy to derive velocity fields across each of the control volumes during each time step of the simulation. More particularly, the general equations of fluid motion include (written in tensor form):

$$\partial \rho / \partial t + \partial \rho u_i / \partial x_i = 0 \quad \text{(continuity equation)}$$

$$\rho \partial u_i / \partial t + \rho u_j \partial u_i / \partial x_j = -\partial P / \partial x_i + \sigma_{ij} + \rho g_i \quad \text{(momentum equation)}$$

$$C_p \partial \rho T / \partial t + C_p \partial \rho u_i T / \partial x_i = \partial P / \partial t + u_i \partial P / \partial x_i + \partial / \partial x_i (k \partial T / \partial x_i) + \mu \Phi + Q \quad \text{(energy equation)}$$

where: $u_i$ is the velocity is the i-coordinate direction, t is time, $x_i$ is the spatial coordinate in the i-direction, P is pressure, $\sigma_{ij}$ is the strain rate tensor, $C_p$ is constant pressure specific heat, T is temperature, k is thermal conductivity, Φ is viscous dissipation, and Q is internal heat sources.

For simulation purposes, these equations are discretized into algebraic equations which are readily solved by iterative numerical techniques. Specifically, the discretized conservation equations for all control volumes are solved in an iterative manner. For example, when the x momentum equation is solved, all other unknowns are fixed (such as y and z momentum (in the 3D case), pressure, and density) to their most current iterative values, resulting in the only unknown variable being the x momentum. The resulting set of linear equations for the x momentum is then solved with a conjugate gradient type method for example. The x momentum field is then updated and this process is repeated for the y momentum, then z momentum, etc., working the iteration through each unknown variable. At the end of the iterative loop, all unknowns have effectively been updated to the next iteration level. This iterative cycle is continued until a set of convergence criteria are achieved (based on residuals and iterative value changes), and then the time step is complete and the variable fields (velocity, pressure, temperature, etc.) are effectively updated to the next time and the above procedure is repeated again for the next time step. As a result of solving these equations, the velocity field ($v_x$, $v_y$, and $v_z$) in each control volume is determined as well as all other flow field variables (pressure, etc).

Those skilled in the art will appreciate that knowing the volume fractions, and subsequently average volume centered values of density ρ and viscosity μ for each of the control volumes (as well as all other flow field variables), many different alternative solution schemes may be used to calculate the velocity fields or other values needed in order to calculate movement of the microgrid cells. The present invention provides the advantage that numerous different fluids materials may be used in a simulation with the volume fractions of the control volumes being readily calculated. From these volume fractions, average parameters needed to solve equations of fluid motion can be readily derived. Consequently, a wide number of methods or algorithms can be used to estimate velocity fields or other variables which are useful in computational fluid dynamic simulations. These parameters would then be used to advect or move microgrid cells as will be described below.

Step 170 includes advecting the microgrid cells within the macrogrid and each of the control volumes in accordance with the iterative velocity fields calculated in step 160. This displacement of microgrid cells will result in some of the microgrid cells overlapping one another in some of the microgrid locations and other microgrid locations being left void. FIG. 4 illustrates such a microgrid containing overlapping and void microgrid locations.

The microgrid cells move only as a complete unit and individually represent a single material. A fundamental premise of the microgrid scheme is that a material may not become less than 1 microgrid in size. The microgrid is the fundamental length or volume scale in the simulation. Each microgrid cell reacts to its associated local control volume or macrogrid velocity conditions and may subsequently be displaced to another control volume after movement is rectified.

Movement or displacement of a microgrid cell in a particular direction is determined by the velocity field of the control volume in a particular direction (x, y or z) and the duration of movement, i.e., the length of the time step. For example, if the average velocity of a control volume in the x-direction, as determined in step 160, is 0.5 meters/second and the duration of a time step is 1 second, then each of the microgrid cells in that control volume would want to be moved 0.5 meters along the x-direction. If the size of each microgrid cell is 0.5 meters, then each microgrid cell in that particular control volume would be displaced by one microgrid cell. Similarly, the microgrid cells in the control volumes may also move in the y- and z-directions, if a 3 dimensional model were used.

Movement of the microgrid cells is only allowed if the microgrid cell has reached the threshold of moving at least one microgrid cell unit. In this exemplary embodiment, when a microgrid cell experiences a velocity condition too small to warrant movement, this information is flagged and the next iteration step is performed and so on until movement is imminent based on the local velocity field. If the velocity field is not of sufficient strength to warrant movement of a microgrid cell, then it simply remains in its current location. In this way, an accurate accounting of the effects of velocity can be maintained while utilizing a somewhat coarse microgrid.

As the advection step begins, an interim array is used to receive advected microgrid cell information. This interim array is initialized to values of "1", and the size of the interim array corresponds to the size of the microgrid cellular field. During the advection step, new microgrid cell values are constructed via a multiplicative association of primes and then stored in the interim array at the appropriate locations. For example, a microgrid cell receiving one copy of a single material (such as material 1) would be represented by 1×43=43. A microgrid cell receiving 2 different materials may be numerically represented as 1×43×53=2279, which indicates the presence of both materials 1 and 3 in the microgrid cell. Similarly, a cell may receive two copies of the same material (e.g. 1×43×43=1849). If no material is advected into an interim array location, then the value remains as "1" and indicates that void is present. Again, FIG. 4A illustrates the spatial distribution of prime numbers in a macrogrid after the advection step 170 is complete. (Note that the original distribution of microcell fluid materials before the advection step is shown in FIG. Where there is a void, the array contains a numeral "1". Where there is an overlap of microgrid cells, the product of the material identifiers (primes) of the overlapping microgrid cells is given.

After every iteration within a time step the microgrid cells must be reallocated, step 180, so that there are no remaining overlapping cells or voids in the microgrid. Microgrid locations that contain more than one identifying prime number or material must be stripped to a single prime number with the other identifiers shifted to new locations. Microgrid locations void of any prime identifier must be filled. The reallocation scheme preferably is designed to achieve the objectives of insuring conservation of variable fields (mass, momentum, and energy).

A correction algorithm is designed to detect values that are larger than the largest prime in the system, which are representative of overlaps of microgrid cells. These few numbers are then evaluated to ascertain the contents of the associated microgrid cells. By controlling what primes are available to create interim microgrid cell values, the evaluation of overlapping and void microgrid spaces is reduced to a single greater than or less than comparison. Consequently, when a large number is detected, the possible factors of that number are contained in a small subset of the known primes. Specifically, these are the primes created by the Eulerian quadratic generator, p(N), defined in Table 1. All together, this technique greatly reduces the computational cost to evaluate the contents and reorganization of microgrid cells.

For example, given the numeric representation in FIG. 4B, the algorithm detects that the number 2279 is larger than the largest prime in the system (which in this case is 53) and begins a scheme that delineates the contents of the cell, breaking the integer 2279 into its prime components that represent the materials therein. Specifically, the algorithm exploits the concept of modular arithmetic until a solution of 0 is calculated. Recall from the rules of modular arithmetic that (2279 mod 53)=43. And, (43 mod 43)=0.

Figure 6:
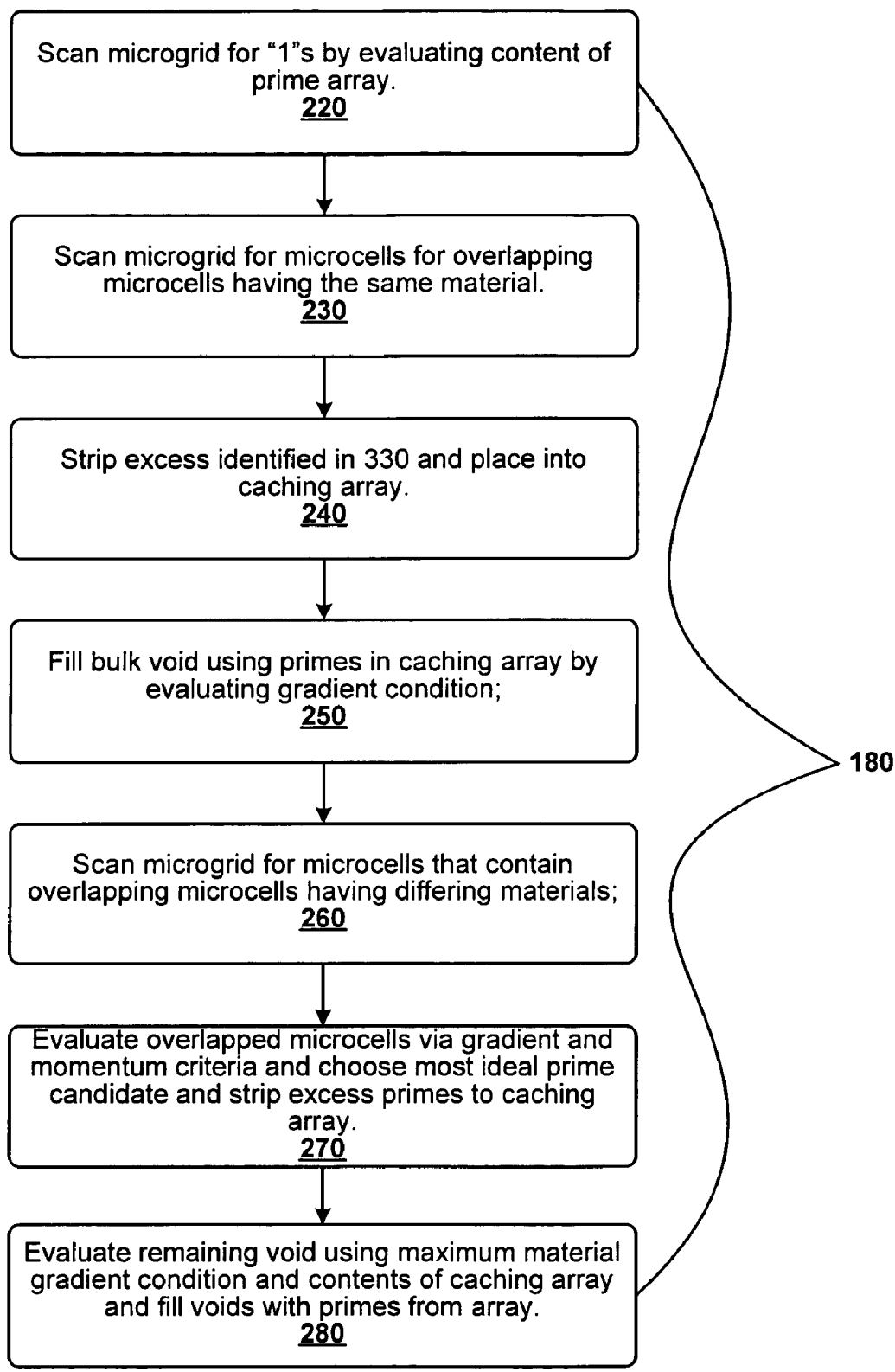
FIG. 6 is a flowchart describing steps for reallocating microgrid cells.

A preferred exemplary reallocation procedure is described in Flowchart 2 of FIG. 6. Again, those skilled in the art will realize that many other alternative reallocation procedures or algorithm could be used to rearrange the overlapping microgrid cells and voids to establish a microgrid having a single fluid material or microcell in each microgrid location, as was the case in the initial microgrid cell arrangement shown in FIG. 3. The different reallocation procedures can be used to achieve different reallocation objectives such as using subiterations to balance material distributions.

The first step 220 in FIG. 6 is to scan the entire microgrid field for "1"'s or void locations. Recall that the temporary grid that holds the transported or fluxed identifiers (primes) is initialized with 1's. If no primes flux into a microgrid location, the value "1" is maintained. These locations correspond to a microcellular void and a sum of their number gives a maximum number of overlap sites that subsequently sizes a caching array. It is possible that a single location may hold more than one overlap so void locations may outnumber overlapped locations. The caching array is used to record excess or stripped identifiers from microgrid cells during the reallocation process.

Next in step 230, the microgrid is scanned for microgrid cells that contain overlapped single materials. These are locations that contain multiple copies of the same prime number. In this situation, the excess primes are stripped (step 240) from the microgrid cells using modular arithmetic and then placed into the caching array, while one copy is left behind to fill the location. Mathematically, the following evaluation occurs:

If: $f > \rho(N_{max})$ and $MOD(f, \rho(N))=0$ where $f > \rho(N)$, $\rho(N)=N^2+N+41$, and $f, N \in Z^+$, $N=\{N_1, N_2, N_3, \ldots, N_{max}\}$.

then there are multiple copies of the same prime (or material). In step 250, subsequently the "1"'s locations are quickly evaluated against their gradient condition. The gradient condition is evaluated by solving $\nabla f_N = 0$. The bulk void is filled using available primes from the caching array by evaluating the gradient condition (in 2D or 3D space). This means that if all the microgrid cells in closest proximity (i.e. every touching microgrid cell) are the exact same prime number, and there is an equal prime number available in the caching array, the "1" is immediately replaced with the corresponding prime. This reduces the number of locations that must be evaluated in a conservation of mass routine, to be described below.

At this point the microgrid system may still contain overlaps that hold different primes as well as still having void or "1" locations. The "1" locations typically develop at interfaces, grid edges, or in areas of large scale (relative to the mesh) bulk motion. The overlaps are all interfacial areas.

Once again, the microgrid is scanned for cells that contain more than one prime (or different materials). This is done in step 260 by exploiting the property of the Eulerian generator, $p(N)=N^2+N+41$ ($N=1,2,\ldots 39$), such that the smallest prime squared is larger than the largest prime.

If: $f > \rho(N_{max})$ and $MOD(f, \rho(N)) > 0$ where $f > \rho(N)$, $\rho(N)=N^2+N+41$, and $f, N \in Z^+$, $N=\{N_1, N_2, N_3, \ldots, N_{max}\}$, then, these locations correspond to microgrid cells with interfacial overlap.

When these cells are located, all of the prime identifiers are removed from the location. An evaluation is made as to which prime most appropriately fills the location. This is done by an evaluation of local fluid fraction gradient and a momentum value assigned to each material based on the local velocity condition. More particularly, the overlapped cells are evaluated based on gradient, $\nabla f_N$ and momentum, $\rho_N |v|$, criteria, such that a physical motivation is established to identify the correct material distribution. The most ideal candidates for primes are chosen and the excess primes are stripped to the caching array.

Once all of the overlaps are corrected, all that is left are microgrid cellular locations that contain a "1" and the remaining material identifiers in the caching array. In step, 280, the remaining voids are evaluated using maximum material gradient condition, momentum considerations and material content of the caching array. Ideally, a particular material or prime is selected such that its reallocation provides a maximum or optimal gradient condition. Mathematically, this means that $p_N$, such that min ($\nabla f_N$) for $N=1, 2, 3, \ldots$. This choice of material is preferably overridden if a microcell exceeds a predetermined momentum criteria, i.e. momentum=mass of microcell×velocity which is greater than a predetermined threshold for momentum. If so, the high momentum microgrid cell(s) are located in the void. In this way, individual high momentum microcells are allowed to "pierce" otherwise continuous flows of other materials.

Figure 7:
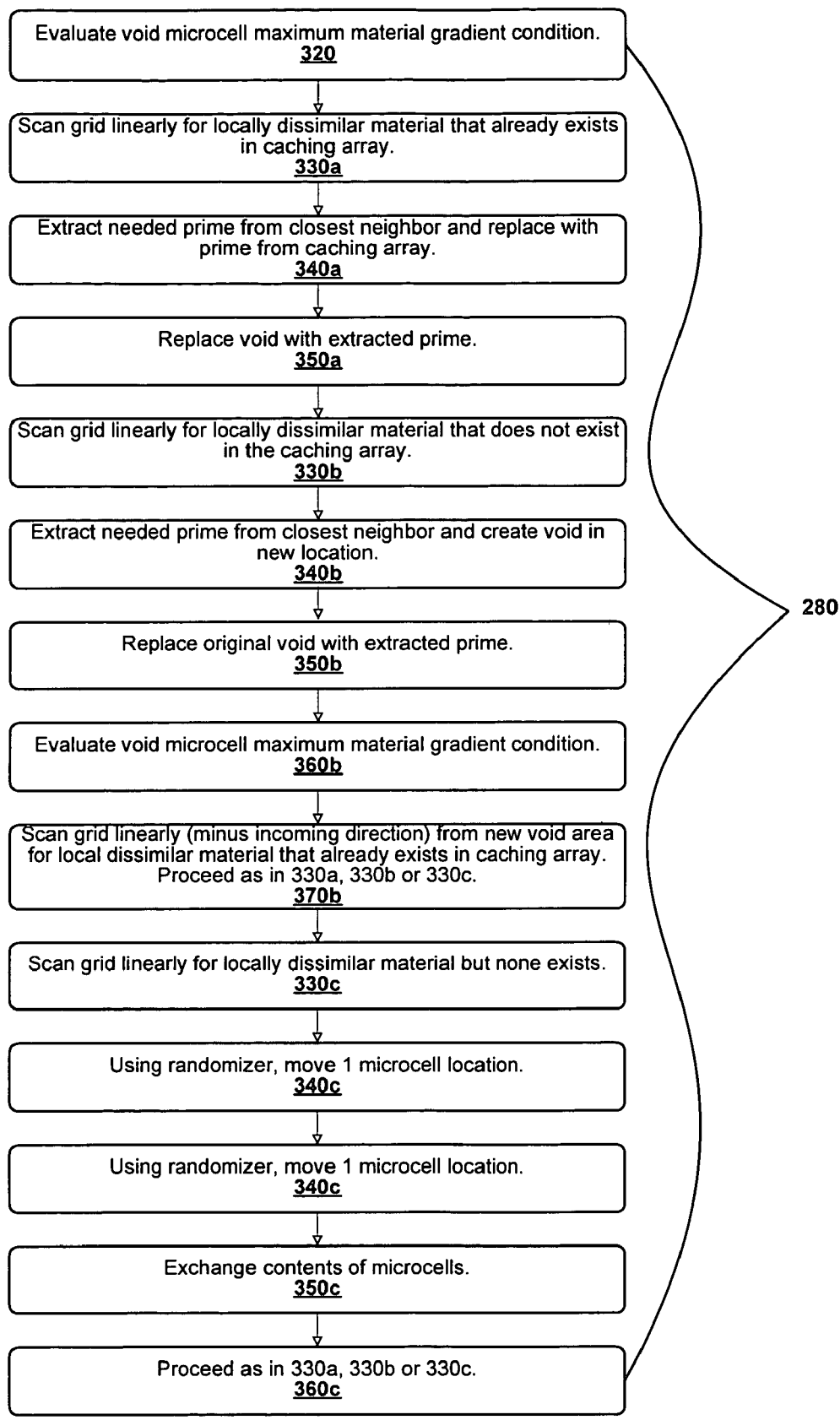
FIG. 7 is a flowchart describing steps in scanning a grid and reallocating microgrid cells into voids found in the microgrid.

FIG. 7 shows a third flowchart which summarizes step 280 used in evaluating and filling these remaining voids. In step 320, the microgrid voids are evaluated for maximum gradient condition. More specifically, the maximum gradient condition is evaluated by scanning linearly for locally dissimilar material as described in step 330a. FIG. 5A illustrates that from a particular starting "S" void location, neighboring microgrid cells are scanned in 8 linear directions. The scan begins in the direction with the greatest gradient. If the prime selected is available in the caching array, a replacement is made in the particular void.

In step 340a, the needed prime is extracted from its closest neighbor and is replaced with a prime from the caching array. In step, 350a the void is replaced with the just extracted prime.

If a desired prime is not available in the caching array, a scan, step 330b, is made starting from the particular microgrid void or starting position "S" and moving out in every linear direction (8 in 2D, 26 in 3D) where an attempt is made to find the prime locally. Once found, the microgrid is adjusted in that direction to compensate for a material imbalanced distribution. In step 340b, the needed prime from the closest neighbor is extracted and a void is created in a new location. The original void is then replaced with the extracted prime, step 350b. The 'new' void is then evaluated for maximum gradient condition in step 360b. In step 370b, the grid is scanned linearly from a new void area for local dissimilar material that already exists in the caching array. Steps 330a, 330b and 330c are then repeated.

Step 330c provides a procedure to address the issue of an unsuccessful grid scan for dissimilar materials. Using a randomizer, the starting location for the scan is moved in step 340c. In step 350c, the contents of microgrid cells are exchanged. Again the steps may be taken as described in steps 330a, 330b or 330c.

Usually what results is a slight local reorganization that conserves mass. If this is not possible, a mass error is accrued and through the progress of a calculation, the total mass error is determined and used as a gauge to evaluate the overall simulation accuracy.

Once broken down, a separate algorithm, described in Flowchart 3 of FIG. 6 evaluates the local condition $\nabla f_N$ for each N and designates the best candidate prime for the previously overlapped microgrid cell. The prime NOT replaced in the once mixed cell is then redistributed to a next best location. Ideally, this location is the closest cell in the direction of its strongest material gradient. The algorithm is designed to scan in this direction in search of an empty cell that will be best filled by the prime. If no such cell can be found, in 2D, 8 directions are scanned as shown in FIG. 5A. If still no candidate can be located, the initial search is abandoned.

A small adjustment to the starting location of the search is made and the multi-directional scan is resumed (see FIG. 5B). The user can define how many times these small adjustments will be tolerated before an "interfacial bump", for lack of a better description, is implemented. What happens is this: the direction associated with the largest material gradient is rescanned for a closest interface. At the interface, a material exchange is made, replacing the closest interfacial cell with the local material at hand and then using this location as a starting point to seek out a new site for the material that was displaced, using the original searching algorithm. After several iterations of this sequence, all empty microgrid cells and overlaps are corrected.

If sufficient iteration steps have occurred to achieve convergence, the iteration is ended. If additional time steps are required, then step 150 is repeated using the reallocated cells and their primes from step 180 to redetermine the volume fractions in each of the control volumes. Steps 160-190 are repeated until it is determined that sufficient time steps have occurred and the simulation is ended in step 200.

COMPUTATIONAL EXAMPLE 1

Circulating rectangular cavity flow offers a rigorously investigated, complicated flow pattern for the reader's review. In this example, the cavity is initialized with a stratified pattern of three similar materials, differing only in prime designation not material properties. In this manner the similarity of the flow form is qualified by literature comparison to a single fluid flow, as well as to illustrate the use of three numerically distinct materials in the microgrid algorithm.

Figure 8:
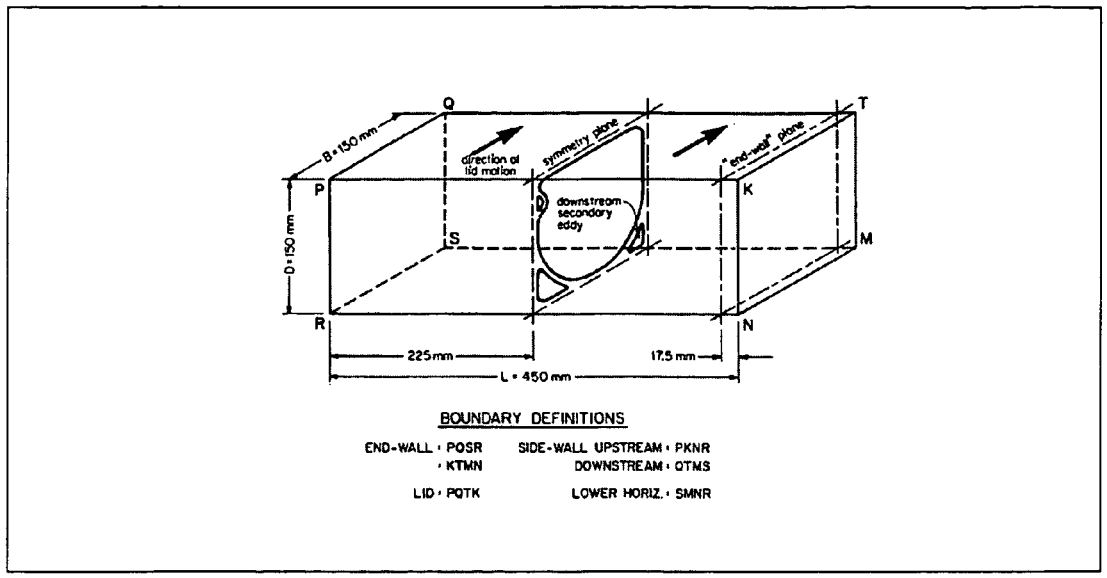
FIG. 8 shows a definition for a theoretical flow in a rectangular cavity in which a plurality of fluid materials is allowed to swirl and mix.
Figure 9:
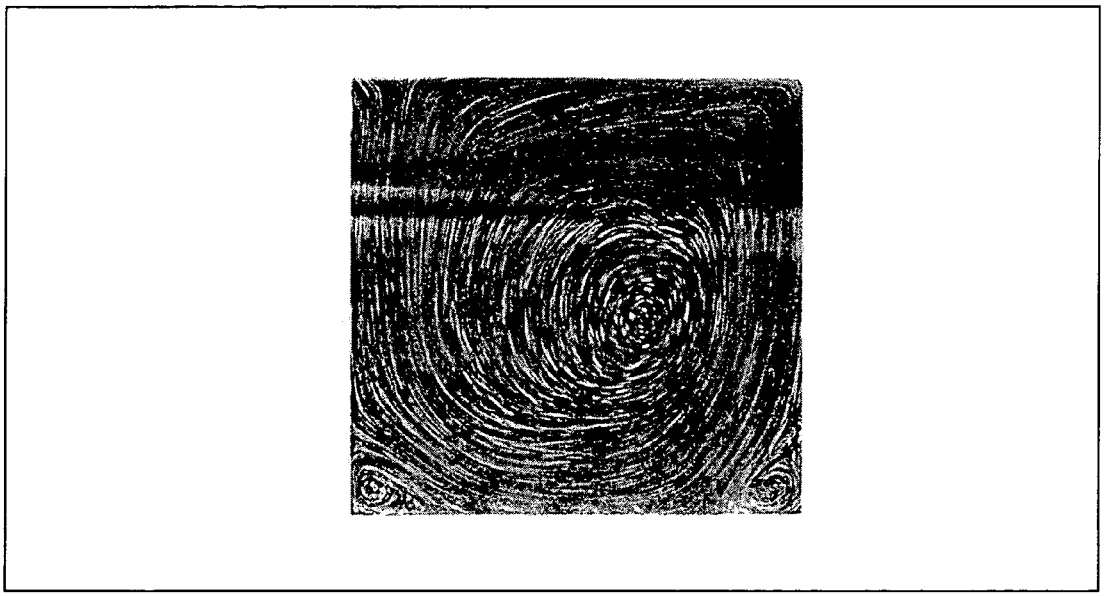
FIG. 9 is a photographic representation of a test showing the swirl pattern in a rectangular cavity defined in FIG. 8.
Figure 10A:
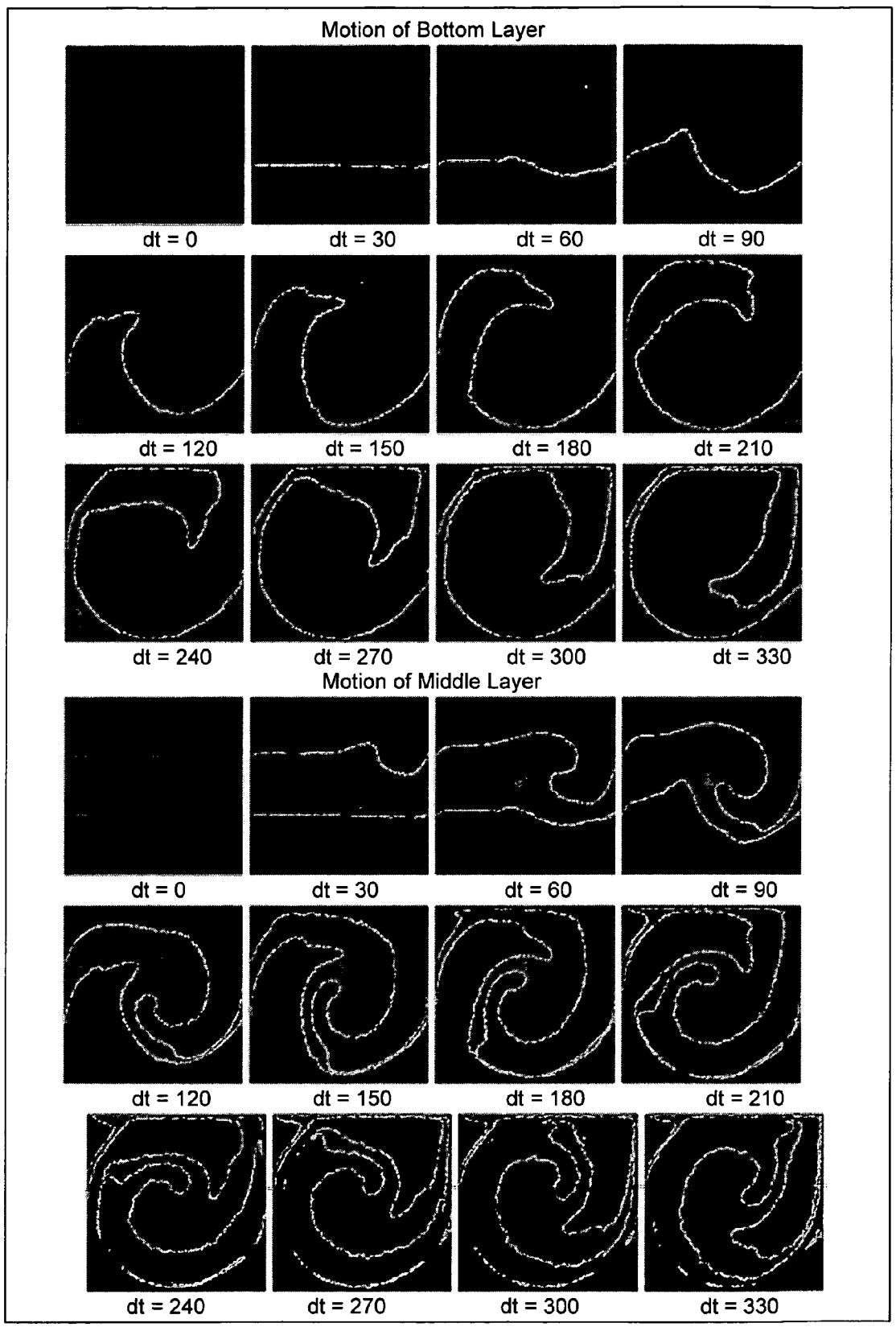
FIGS. 10A and 10B show a shear driven recirculating cavity flow with three distinct numerical layers employing the microgrid algorithm of the present invention.
Figure 10B:
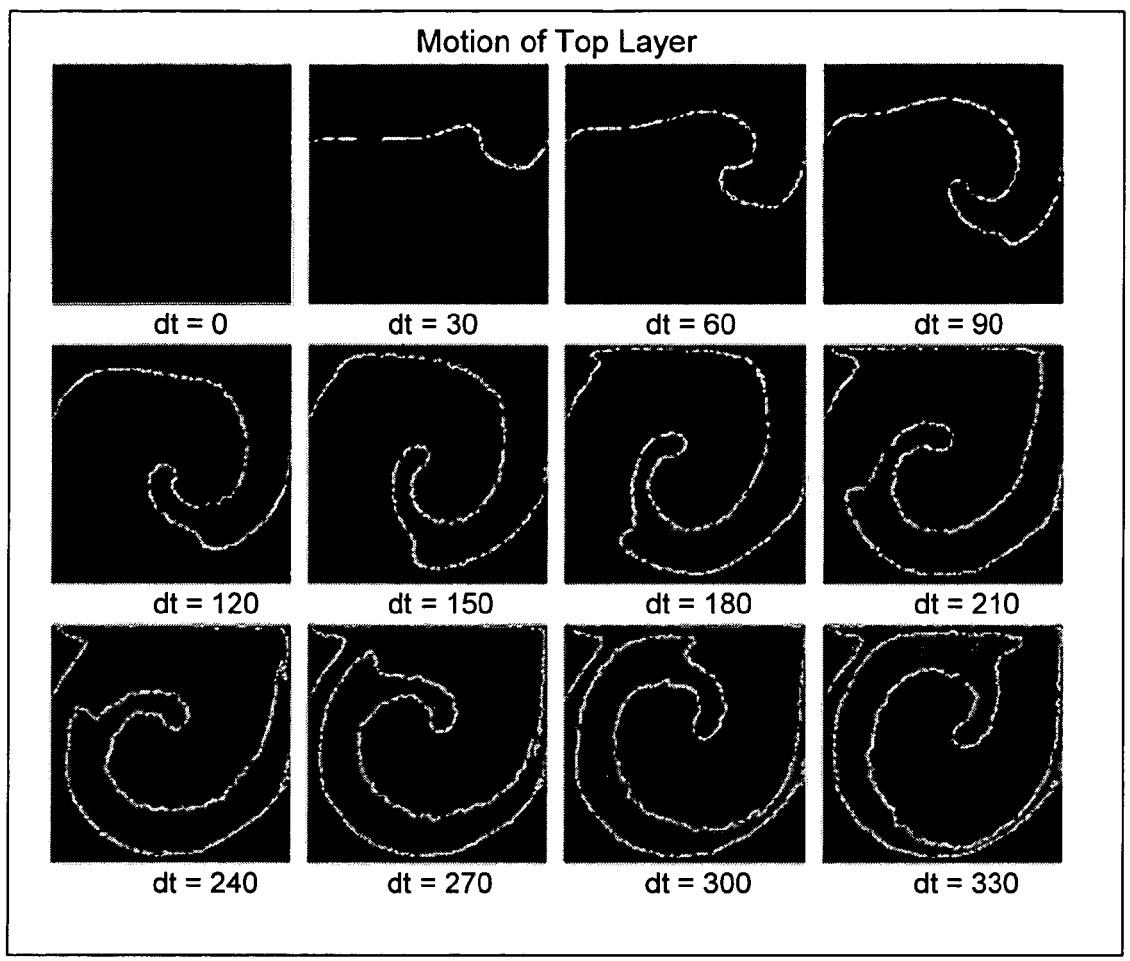
Figure 11:
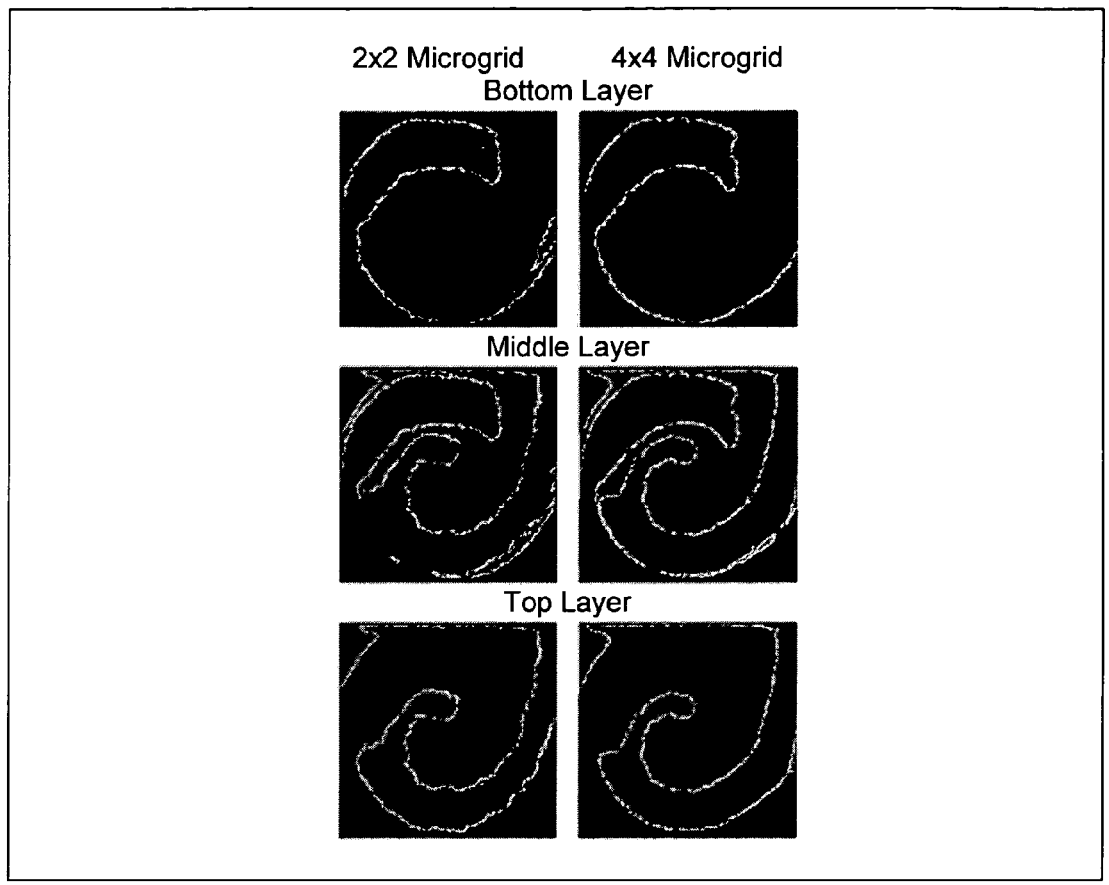
FIG. 11 shows a shear driven recirculating cavity flow with 3 distinct numerical layers employing the microgrid algorithm with a 2×2 refinement and a comparative 4×4 refinement at a time of 210 seconds.

Rhee et. al. (1984) and Freitas (1986) describe a similar recirculating cavity flow such that given the schematic of FIG. 8, a plate drives a continuous shear motion from front to back at the top of the cavity. FIG. 8 also illustrates the formation of secondary eddies in three of the four corners of the cavity along a center plane. FIG. 9 is a photograph of Rhee's experimental flow along a similar plane for comparison. FIG. 10 is a rendering of the microgrid algorithm output for the three stratified materials described in the previous paragraph.

As shown in FIG. 10, clearly a portion of the bottom layer is trapped in the lower two eddies, while the balance of the material travels through the recirculation pattern. The middle layer is most heavily mixed as it is quickly taken up in the primary circulation cell then partially fragmented as it makes its first full rotation. The top layer is partially trapped in the upper left hand corner eddy with the balance following the primary circulation cell. It is obvious that the microgrid algorithm is correctly capturing the proper features of the recirculating cavity flow physically documented in FIG. 9 by Rhee et. al (1984) and computationally rendered by Freitas (1986), while simultaneously tracking three numerically separate materials.

To capture this refined detail, the simulation employs a fairly coarse mesh. The physical dimension of the cavity portrayed in FIG. 10 is 150 mm×150 mm. The computational macrogrid is 126×126. The microgrid cell mesh is 4×4. Numerical experiments verify that an increase in microgrid mesh while maintaining the original computational mesh yields more refined results with a minimal increase in computational expense.

EXAMPLE 2

As an example, this same simulation is offered with 126×126 computational mesh and a microgrid cell mesh of 2×2 (¼ of the microgrid resolution shown in the above simulation of FIG. 10) in a side by side comparison at time step=210. This time step is chosen because it shows adequate detail of all the eddy features.

Because the algorithm employs an additive and collective response measure to the effect of velocity over multiple time steps, the more coarse the microgrid cell refinement is, the less immediate physical response one can see in areas of relatively low velocity. Similarly, because of the block-like movement of microgrid cells, to capture areas of high thinning, microgrid cell size must be reduced. This is most evident in the middle layer, where material should form thin trails in response to the shear motion of the primary circulation cell. Also, while the overall response of the system at coarse micromesh is good, it may be noted that interfacial smoothness and subtle feature resolution is increased with the refinement of the microgrid. It is important, however, to realize that at no time is the computational mesh adjusted. These calculations are coupled to the microgrid via a fluid fraction value only, and the computational mesh is completely independent of microgrid cell size. The best computational value, therefore, utilizes a coarse computational mesh with a refined microgrid mesh.

As the only algorithmic limitation of the microgrid process demonstrated here with $p(N)=N^2+N+41$ is a numerical cap of 39 materials, it can easily be demonstrate that the simulation methodology can be used with a larger number of materials. Of course, the computational grid selection must be chosen with prudence. Just as in a 2 material simulation, it is not wise to represent a single material over too few computational cells.

EXAMPLE 3

Figure 12:
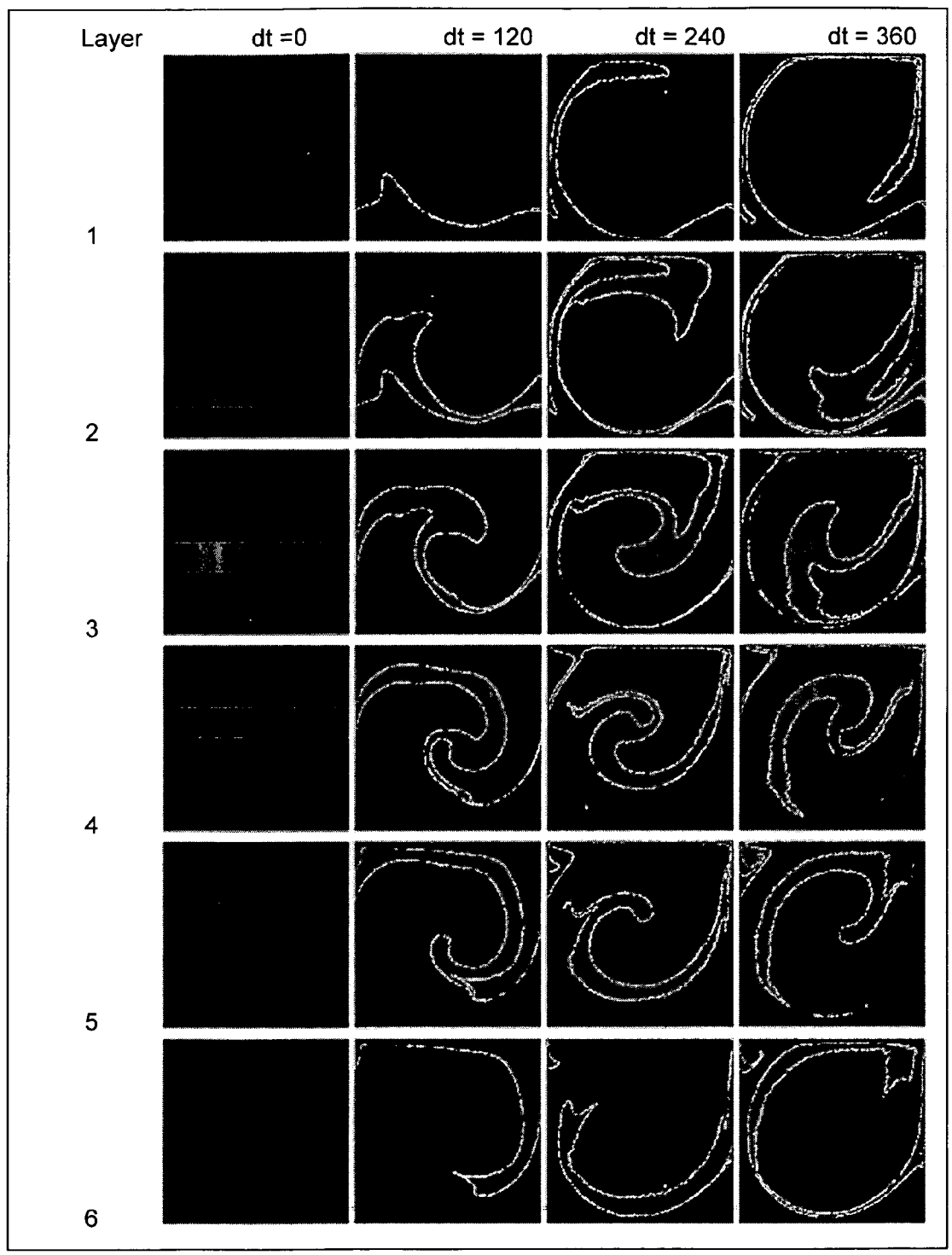
FIG. 12 shows a shear driven cavity flow with 6 materials at time steps of 0, 120, 240, and 360 seconds utilizing a 8×8 microgrid.
Figure 13:
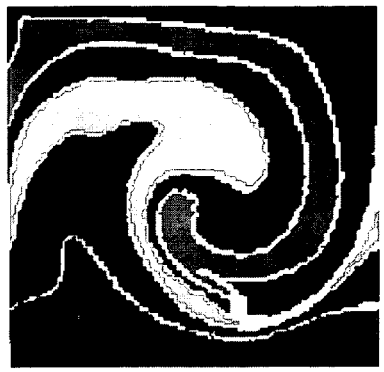
FIG. 13 shows an artistic rendering of a shear driven cavity flow with 6 colocated materials at 120 seconds.

The results shown in FIG. 12 utilize a 126×126 computational mesh with an 8×8 microgrid mesh. FIG. 13 is an artistic rendering of the 6 materials in the same view at time step=120.

While in the foregoing specification this invention has been described in relation to certain preferred embodiments thereof, and many details have been set forth for purposes of illustration, it will be apparent to those skilled in the art that the invention is susceptible to alteration and that certain other details described herein can vary considerably without departing from the basic principles of the invention.

REFERENCES

Daly, B. J., 1969, A technique for including surface tension effects in hydrodynamic calculations. Journal of Computational Physics, Vol. 4, p. 97-117.

Takizawa, A., Koshizuka, S., and Kondo, S., 1992, Generalization of physical component boundary fitted co-ordinate (PCBFC) method for the analysis of free-surface flow. International Journal of Numerical Methods in Fluids, Vol. 15, p. 1213-1237.

Sussman, M., Smereka, P. and Osher, S., 1994, A level set approach for computing solutions to incompressible two-phase flow. Journal of Computational Physics, Vol. 114, p. 146-159.

Osher, S. and Sethian, J. A., 1988, Fronts propagating with curvature-dependant speed: algorithms based on Hamilton-Jacobi formulations. Journal of Computational Physics, Vol. 79, p. 12-49.

Sethian, J. A., 1996, Level set methods: Evolving interfaces in geometry, fluid mechanics, computer vision and materials sciences. Cambridge University Press.

Nichols, B. D. and Hirt, C. W., 1973, Calculating three-dimensional free surface flows in the vicinity of submerged and exposed structures. Journal of Computational Physics, Vol.12, p. 234-246.

Harlow, F. H. and Welch, J. E., 1965, Numerical calculation of time-dependent viscous incompressible flow of fluid with free surface. Physics of Fluids, Vol. 8(12), p. 2182-2189.

Hirt, C. W. and Nichols, B. D., 1981, Volume of fluid (VOF) method for the dynamics of free boundaries. Journal of Computational Physics, Vol. 39, p.201-225.

Ashgriz, N. and Poo, J. Y., 1991, FLAIR: Flux line-segment model for advection and interface reconstruction. Journal of Computational Physics, Vol. 93, p. 449-468.

LaFaurie, B., Nardone, C., Scardovelli, R., Zaleski, S., and Zanetti, G., 1994, Modeling merging and fragmentation in multiphase flows with SURFER. Journal of Computational Physics, Vol. 113, p. 134-147.

Noh, W. F. and Woodward, P., 1976, SLIC (Simple Line Interface Calculations). Lecture Notes in Physics, Vol. 59, p. 330-340.

Youngs, D. L., 1982, Time-dependent multi-material flow with large fluid distortion. (in) Morton, K. W. and Baines, M. J. (eds) Numerical Methods for fluid dynamics. London: Academic Press. p. 273-285.

Rider, W. J. and Kothe, D. B., 1998, Reconstructing volume tracking. Journal of Computational Physics, Vol. 141, p. 112-152.

Gueyffier, D., Li, J., Nadim, A., Scardovelli, R. and Zaleski, S., 1999, Volume-of-fluid interface tracking with smoothed surface stress methods for three-dimensional flows. Journal of Computational Physics, Vol. 152, p. 423-456.

Scardovelli, R. and Zaleski, S., 2000, Analytical relations connecting linear interfaces and volume fractions in rectangular grids. Journal of Computational Physics, Vol. 164, p. 228-237.

Scardovelli, R., Aulisa, E., Manservisi, S., and Marra, V., 2002, A marker-VOF algorithm for incompressible flows with interfaces. Proceedings of ASME FEDSM'02, ASME 2002 Fluids Engineering Division Summer Meeting, Montreal, Quebec, Canada, FEDSM2002-31241, p. 1-6.

Tomiyama, A., Nakahara, Y., and Abe, S., 2002, An interface tracking method based on volume tracking in embedded micro cells. Proceedings of ASME FEDSM'02, AMSE 2002 Fluids Engineering Division Summer Meeting, Montreal, Quebec, Canada, FEDSM2002-31147, p. 1-6.

Rhee, H. S., Koseff, J. R., and Street, R. L., 1984, Flow visualization of a recirculating flow by rheoscopic liquid and liquid crystal technique. Experiments in Fluids, p. 57-64.

Freitas, C. J., 1986, Nonlinear transient phenomena in a three-dimensional cavity flow: A numerical investigation. PhD dissertation, Stanford University.

What is claimed is:

1. A method for creating a simulation of flow of N materials and their interfaces in a computational domain, the method comprising the steps of:

(a) creating a macrogrid including control volumes on a computational domain in which N materials and their interfaces are to be tracked, wherein the number N of materials tracked is at least 2;

(b) overlaying a microgrid including microgrid cells upon the macrogrid with each of the microgrid cells being coupled to a control volume;

(c) initializing the macrogrid and control volumes with initial and boundary conditions;

(d) assigning a unique identifier to each of the N materials and to the microgrid cells;

(e) calculating volume fractions for the N-materials in the control volumes;

(f) solving equations of motion upon the macrogrid and control volumes utilizing the calculated volume fractions to arrive at local velocity conditions for the control volumes;

(g) advecting the microgrid cells within the microgrid based on the calculated local velocity conditions in the control volumes such that voids and overlaps of the microgrid cells in the microgrid occur;

(h) calculating whether voids and overlaps are present using a product of the unique identifiers;
(i) reallocating the microgrid cells so that only one material is in each microgrid cell to effectively conserve mass and satisfy local fluid fraction gradient values;
(j) repeating steps (e)-(i) until the simulation is complete; and
(k) outputting the simulation.

2. The method of claim 1 wherein:
the unique identifiers are prime numbers.

3. The method of claim 1 wherein:
the unique identifiers are numbers generated by an Eulerian quadratic number generator.

4. The method of claim 2 wherein:
modular arithmetic is used to track the materials which are advected into the microgrid cells.

5. The method of claim 1 wherein:
the number N of materials tracked is at least 3.

6. The method of claim 1 wherein:
the number N of materials tracked is at least 4.

7. The method of claim 1 wherein:
the interfaces between the N materials are tracked by location of the microgrid cells containing different materials.

8. A method for determining whether overlapping cells and voids are present in a grid of a fluid dynamics computation comprising:

assigning unique identifiers to cells located in a grid, the unique identifiers being associated with respective fluid materials;

advecting the cells within a grid based on local velocity conditions such that some of the cells overlap one another in the grid and voids are created in the grid;

calculating whether overlapping cells and voids are present in the grid using a product of the unique identifiers of each of the cells located at a particular microgrid location; and outputting a chart corresponding to the fluid materials in the cells with the product of the unique identifiers at overlapping cells present in the grid.

9. The method of claim 8 wherein:
the unique identifiers are prime numbers.

10. The method of claim 8 wherein:
modular arithmetic is applied to the product of the unique identifiers of overlapping cells to determine which fluid materials are present in overlapping cells.

11. The method of claim 8 wherein:
the chart corresponding to the fluid materials in the cells has a numeral "1" at voids present in the grid.

* * * * *